Oct. 13, 1942.　　W. R. GREGGAINS　　2,298,691
FISH LURE
Filed Oct. 8, 1941
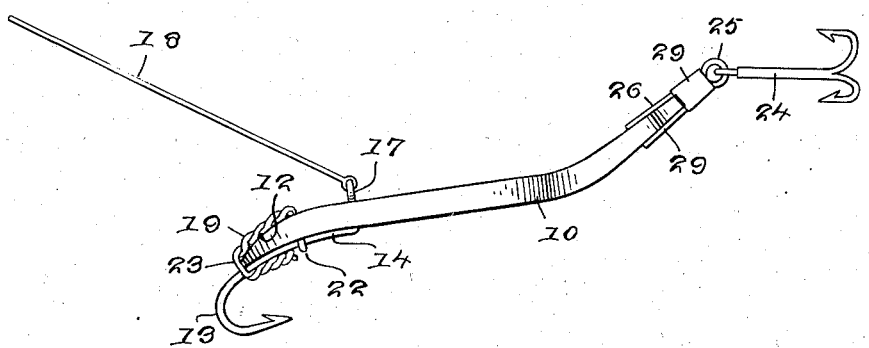
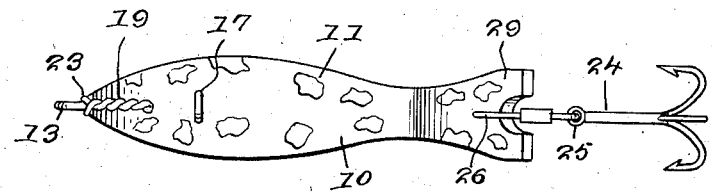
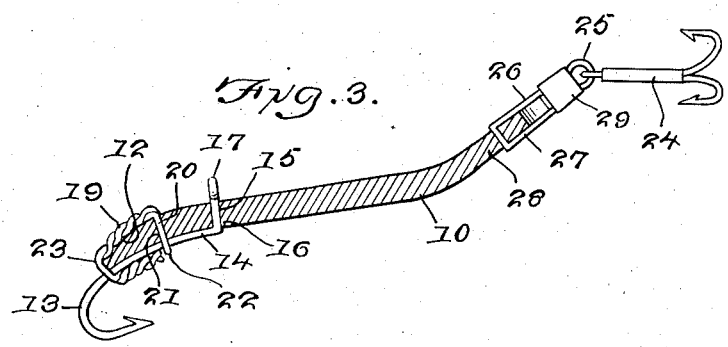
William R. Greggains
INVENTOR.
BY
Victor J. Evans & Co.
ATTORNEYS Patented Oct. 13, 1942

2,298,691

UNITED STATES PATENT OFFICE 2,298,691

FISH LURE

William R. Greggains, Rome, N. Y.

Application October 8, 1941, Serial No. 414,199

4 Claims. (Cl. 43—42)

This invention relates to a fish lure and has for an object to provide a fish lure having the fish line securing eye set back on the side of the head of the artificial minnow and having a bevel on the head on the same side from the eye, the minnow also being reversely curved longitudinally, the former feature tending to force the minnow out of a straight line when the fishing line is reeled, the curvature of the minnow assisting the action so that the minnow will simulate the movements of a natural minnow in the water.

A further object is to provide an artificial minnow constructed as just described having a hook rigidly secured to and extending forwardly beyond the head, the shank of the hook contacting with the side of the head and the angular rear end of the shank extending through the body of the minnow and being equipped with the eye to which the line is connected, this position of the hook serving to insure the efficiency of the lure since nearly all game fish swallow a minnow head first because the fins of a minnow are of a bony structure and are so attached to the body that they catch in the throat of a larger fish trying to swallow the small fish.

A further object is to provide a fish lure constructed as described in the first paragraph and having a gang hook on the tail to increase the efficiency of the lure since a larger fish before swallowing a small fish, as a rule, will grab it by the tail and will bite hard enough to nearly paralyze the smaller fish.

A further object is to provide a fish lure in which the coloring is part of the material from which the minnow is constructed so that no painting is necessary.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1 is a top plan view of a fish lure constructed in accordance with the invention.

Figure 2 is a side elevation of the fish lure shown in Figure 1.

Figure 3 is a longitudinal sectional view of the fish lure shown in Figure 1.

Referring now to the drawing in which like characters of reference designate similar parts in the various views, 10 designates the lure body, the same simulating a minnow in contour and being reversely curved longitudinally. The body is formed of transparent material having translucent particles 11 embedded therein producing an inherent marking resembling that of a simulated minnow. The head of the body is beveled on one side as shown at 12 so that the head terminates in a line rather than a blunt surface.

A hook 13 is secured to the head of the body and extends forwardly beyond the head. The shank 14 of the hook contacts with and extends along one side of the head and is provided with an angular rear end 15 which extends through an opening 16 in the head to the opposite side of the body from the hook and is there equipped with an eye 17 adapted to receiving the fishing line 18.

The shank of the hook is clamped to the side of the head by a twisted wire clamp 19 having a rear portion 20 which extends through an opening 21 in the head and terminates in a loop 22 which straddles the shank of the hook. The clamp extends forwardly along the beveled side 12 of the head and is provided with a loop 23 which straddles the shank, the clamp from thence being extended back along the shank of the hook.

The value of the front hook 13 is that a fish striking from the side at the head will be impaled as well as will a fish striking the head of the minnow in attempting to swallow the minnow head first.

A gang hook 24 is disposed in the rear loop 25 of a wire link 26 the front loop 27 of which is engaged through an opening 28 in the tail 29 of the body 11. A sheet metal coupling 29 is engaged on the link and the sides of the coupling are bent over the link.

The value of the rear gang hook 24 is that a fish striking at the tail of the lure to paralyze the minnow which the lure simulates, will be impaled.

Due to the longitudinal reverse curvature of the body 10, and due to the bevel 12 on the head of the body, and due to the fish line securing eye 17 of the hook being disposed on the side of the head or forward portion of the body, on the same side of the bevel 12 of the head, when pressure is exerted on the fishing line the minnow will be forced out of a straight line in prolongation of the fishing line and assume an angular position to the fishing line, see Figure 1, and at the same time will impart to the lure a body movement similar to the glide of a natural fish swimming.

An important feature of the invention is that should a fish strike from the side of the lure toward the front hook 13, by virtue of the fishing line being secured to the opposite side of the lure from the hook, and beyond the center of the lure, as soon as the fish strikes the pull on the fishing line will reverse the position of the lure so that the tail will be forward and the head rearward and thus assure the hook being positively impaled in the fish.

From the above description it is thought that the construction and operation of the invention will be fully understood without further explanation.

What is claimed is:

1. A fish lure comprising, a body simulating a minnow having longitudinal reverse curvature, a fish line securing eye disposed forwardly of the center of the body on one side of the body, and a fish hook on the other side of the body extending forwardly beyond the body.

2. The structure as of claim 1 and in which the fish hook and the eye are connected by an integral shank portion extending through an opening in the body.

3. The structure as of claim 1 and in which the front end of the body is tapered on one side to meet the other side at the forward end of the body in a line.

4. A fish lure comprising a body of longitudinal reverse curvature, a front hook secured rigidly to the body and extending forwardly beyond the body on one side of the body, the shank of the hook contacting with the lower side of the body and terminating in an angular rear end extending through the body, a fish line securing eye on said shank on the opposite side of the body from the hook disposed forwardly of the center of the body, a clamp formed of twisted wire having a loop engaged through an opening in the body and straddling the shank of the hook, said clamp having a loop contacting the front end of the body straddling the shank of the hook, and a ganghook on the rear end of the body.

WILLIAM R. GREGGAINS.